US010796305B1

(12) United States Patent
Farrow et al.

(10) Patent No.: US 10,796,305 B1
(45) Date of Patent: Oct. 6, 2020

(54) ANONYMIZATION AND SYNCHRONIZATION BASED ON USE OF PROTECTED CONTENT

(75) Inventors: Matthew Farrow, Canton, MA (US); Malay Kundu, Lexington, MA (US); Joshua Migdal, Wayland, MA (US); Vikram Srinivasan, Billerica, MA (US)

(73) Assignee: NCR Corporation, Atlanta, GA (US)

( * ) Notice: Subject to any disclaimer, the term of this patent is extended or adjusted under 35 U.S.C. 154(b) by 1872 days.

(21) Appl. No.: 12/328,585

(22) Filed: Dec. 4, 2008

Related U.S. Application Data

(60) Provisional application No. 61/005,341, filed on Dec. 4, 2007.

(51) Int. Cl.
*G06Q 20/40* (2012.01)
*G06Q 20/34* (2012.01)

(52) U.S. Cl.
CPC ......... *G06Q 20/4012* (2013.01); *G06Q 20/34* (2013.01)

(58) Field of Classification Search
USPC ............ 705/64, 16, 21, 59, 71; 380/44, 262, 380/278, 279
See application file for complete search history.

(56) References Cited

U.S. PATENT DOCUMENTS

| 5,555,504 | A | * | 9/1996 | Lepper et al. ................ 700/115 |
| 5,745,036 | A | | 4/1998 | Clare |
| 5,965,861 | A | | 10/1999 | Addy et al. |
| 6,434,530 | B1 | * | 8/2002 | Sloane ................... G06Q 20/20 235/383 |
| 6,823,203 | B2 | * | 11/2004 | Jordan .......................... 600/407 |
| 7,049,965 | B2 | | 5/2006 | Kelliher et al. |
| 7,080,778 | B1 | | 7/2006 | Kressin et al. |
| 7,118,026 | B2 | | 10/2006 | Harris et al. |
| 7,334,254 | B1 | * | 2/2008 | Boydstun et al. ................ 726/2 |
| 7,416,118 | B2 | | 8/2008 | Throckmorton et al. |
| 8,570,375 | B1 | * | 10/2013 | Srinivasan ............. G06Q 20/20 235/383 |

(Continued)

OTHER PUBLICATIONS

Dialog Search 2020.*

*Primary Examiner* — Dante Ravetti
(74) *Attorney, Agent, or Firm* — Schwegman, Lundberg & Woessner

(57) ABSTRACT

A computer system monitors a private network for presence of data traffic. In one embodiment, the private network is a retail environment in which a customer purchases an item scanned at a point-of-sale terminal. The data traffic can be point-of-sale transaction information generated in response to purchase of the item at the point-of-sale terminal. Subsequent to detecting presence of the data traffic in the network, the computer system analyzes the data traffic to identify private information in the data traffic. To protect the private information from improper disclosure to unauthorized entities, the computer system modifies the data traffic. Thus, techniques herein can include detecting occurrence of one or more point-of-sale events in a private network, anonymizing the event information (e.g., data traffic), and forwarding the anonymized event information associated with the point-of-sale events out of the private network to a remote resource.

16 Claims, 11 Drawing Sheets

(56) References Cited

U.S. PATENT DOCUMENTS

| | | | |
|---|---|---|---|
| 2003/0144971 A1* | 7/2003 | Das | G06Q 10/08 |
| | | | 705/401 |
| 2003/0163416 A1* | 8/2003 | Kitajima | G06Q 20/02 |
| | | | 705/39 |
| 2003/0197782 A1* | 10/2003 | Ashe | H04N 7/18 |
| | | | 348/150 |
| 2004/0078342 A1* | 4/2004 | Goldschmidt Iki et al. | 705/75 |
| 2005/0010475 A1* | 1/2005 | Perkowski | G07F 17/16 |
| | | | 705/14.51 |
| 2005/0038794 A1* | 2/2005 | Piersol | 707/100 |
| 2005/0108359 A1* | 5/2005 | Hyder et al. | 709/217 |
| 2005/0177859 A1* | 8/2005 | Valentino et al. | 725/105 |
| 2005/0233797 A1* | 10/2005 | Gilmore et al. | 463/17 |
| 2006/0261159 A1* | 11/2006 | Redick | G06Q 20/105 |
| | | | 235/383 |
| 2007/0005509 A1* | 1/2007 | Spiller | G06Q 10/087 |
| | | | 705/65 |
| 2007/0057049 A9* | 3/2007 | Kundu et al. | 235/383 |
| 2007/0241188 A1* | 10/2007 | Liao | 235/383 |
| 2007/0272734 A1* | 11/2007 | Lipton et al. | 235/375 |

\* cited by examiner

ANONYMIZATION AND SYNCHRONIZATION BASED ON USE OF PROTECTED CONTENT

RELATED APPLICATIONS

This application is related to and claims the benefit of earlier filed U.S. Provisional Patent Application Ser. No. 61/005,341 entitled "Method and Apparatus for Simultaneous Observation of Events across Multiple Networks," filed on Dec. 4, 2007, the entire teachings of which are incorporated herein by this reference.

This application is related to United States Patent Application entitled "METHOD AND APPARATUS FOR RANDOM-ACCESS REVIEW OF POINT OF SALE TRANSACTIONAL VIDEO," Ser. No. 12/328,419, filed on an even date herewith, the entire teachings of which are incorporated herein by this reference.

BACKGROUND

Retail establishments commonly utilize point of sale or other transaction terminals, such as cash registers, to allow customers of those establishments to purchase items.

As an example, in a conventional department store, supermarket or other retail establishment, a customer collects items for purchase and places the items in a shopping cart, basket, or simply carries them to a point of sale terminal to purchase those items in a transaction. The point of sale terminal may be staffed with an operator such as a cashier who is a person employed by the store to assist the customer in completing the sales transaction. In some cases, retail establishments have implemented self-checkout point of sale terminals in which the customer is the operator. In either case, the operator typically places items for purchase on a counter, conveyor belt or other item input area.

Point of sale terminals typically include a scanning device such as a laser or optical scanner device that operates to identify a Uniform Product Code (UPC) label or bar code affixed to each item that the customer desires to purchase. The laser scanner is usually a peripheral device coupled to a computer that is part of the POS terminal.

To scan an item, an operator picks up each item, one by one, from the item input area such as a conveyor and passes each item over a scanning area such as glass window built into the counter or checkout area to allow the laser scanner to detect the UPC code. After the point of sale computer identifies the UPC code of an item, the point-of-sale scanning terminal performs a lookup in a database to determine the price and identity of the scanned item. Alternatively, in every case where the operator can scan the item, the operator may likewise enter the UPC or product identification code into the terminal manually or through an automatic product identification device such as an RFID reader.

As the operator scans or enters each item for purchase, one by one, the point of sale terminal maintains an accumulated total purchase price for all of the items in the transaction. For each item that an operator successfully scans or enters, the point of sale terminal typically makes a beeping noise or tone to indicate to the operator that the item has been scanned by the point of sale terminal and in response, the operator places the item into an item output area such as a downstream conveyor belt or other area for retrieval of the items by the customer or for bagging of the items into a shopping bag. As well known, after all items in the transaction are scanned in this manner, the operator indicates to the point of sale terminal that the scanning process is complete and the point of sale terminal displays a total purchase price to the customer who then pays the store for the items purchased in that transaction.

These conventional systems that provide for purchase of items using an automated item identification systems such as a scanner suffer from a variety of deficiencies. In particular, operation of such systems can be compromised, either knowingly or unknowingly, by an operator in a manner that allows a customer to receive possession of one or more items without paying for them. For example, such scanning systems are susceptible to "pass-throughs," also know as "sweethearting" in which an operator purposefully or accidentally fails to scan an item as that item moves through the transaction area. In such cases, the POS system never detects the un-scanned item and the item is thus never totaled into the purchase price. Thus, the customer can receive one or more items for free. Retail chains lose millions of dollars a year to operator error or fraudulent activity of this nature.

In a non-fraudulent example, an operator may unknowingly pass an item through the scanning area during a transaction and place the item into the item output area such as a downstream conveyor belt, but no scan of the item took place. Perhaps the operator was not paying attention and did not notice (or did not care) that the scanner failed to beep during scanning of an item.

As an example of "sweethearting" that represents fraud on the retail establishment, an operator assists a customer who is personally known to the operator (e.g. a friend or conspirator of the operator). The scan operator intentionally passes the item over a scan window without the item being detected by the scanner. One way to prevent proper scanning is to cover the UPC label as it is passes by the scanner's detection window. In such a situation, the item is included with other items that may or may not have also been scanned, and the customer or operator continues along with a transaction as if the item was properly scanned. After the operator processes all items in the transaction, either via actual scanning which is often done for the less expensive items to make the transaction look legitimate to anyone who may be watching, or via sweethearting in which case the item not scanned is grouped with items that appear to have be scanned, the customer pays the operator a purchase price reflecting only the sum total of the scanned items. After paying, the customer leaves the store with all items, having only paid for those items that were properly scanned or entered.

In another fraudulent example know as label switching, the operator causes the POS system to scan an item that is different that the item being passed through the scanning area during the transaction. In such cases, a customer or operator may replace a UPC label of an original and often expensive item with a UPC label for another less expensive item. In such cases, a scan takes place but the wrong item is identified by the POS system. In this manner, the system will scan the item for a price that is substantially lower that the value of the item received by the customer.

Security system designers have attempted to develop conventional techniques for detecting fraudulent or accidental operator error in use of POS terminals. The conventional systems in the field of detection of pass-through and sweehearting provide for the detection of abnormally long "scan-gaps". A "scan-gap" is the amount of time between consecutive scans at the point of sale terminal. When an item is passed through without scanning, the scan-gap increases until the next scan. By comparing the scan-gaps between scanned items of a transaction versus the average scan-gap for a given employee operator, the conventional scan-gap method seeks to identify incidents when an item has bypassed the scanner without being scanned.

The conventional scan-gap detection method is widely regarded to be impractical, as scan-gaps have been found to be a "noisy" measure at best. This is due to the fact that perfectly legitimate scan-gaps may vary widely due to delays such as those caused by weighing of produce, manual entry of unlabeled or un-scannable goods, and rescanning of items that did not get scanned on the first pass. As a result, scan-gaps are not a dependable metric for determining improper activity. Thus, conventional systems that attempt to use scan gaps as a method for detecting fraudulent activity are prone to problems.

Other conventional systems include a surveillance camera to record an in-person sales transaction on video. In such an instance, the video can be reviewed at a later time in the store to determine whether there were any scan errors associated with a particular sales transaction.

BRIEF DESCRIPTION

Conventional systems such as those that employ one or more surveillance cameras to record sales transactions for later review suffer from a number of deficiencies. For example, the data associated with a point-of-sale transaction typically includes private information that cannot be publicly disclosed. Thus, there are limitations with respect to review of the recorded video and corresponding point-of-sale transaction information outside of a protected environment such as the store.

Moreover, even if the scan data and corresponding video can be reviewed in both a public and/or private environment, reconciling item scan data with frames of a corresponding video may be difficult or impossible since the system clocks associated with a point-of-sale transaction (or different nodes in a network) are typically not synchronized with system clocks of the surveillance camera or video gathering systems. Because the clocks are not synchronized, it is difficult for a reviewer to map events associated with the point-of-sale transaction to corresponding locations in the video.

In contrast to conventional techniques, embodiments herein include a computer system environment configured to monitor a network such as a private network for presence of data traffic. In one embodiment, the private network is a retail environment in which a customer purchases an item scanned at a point-of-sale terminal. The data traffic can be point-of-sale transaction information or an event generated in response to purchase of the item at the point-of-sale terminal. Subsequent to detecting presence of the data traffic (or occurrence of an event) in the network, the computer system analyzes the data traffic to identify private information in the data traffic. To protect the private information from improper disclosure to unauthorized entities, the computer system modifies the data traffic prior to forwarding. For example, the computer system can remove, obscure, mask, etc., private information associated with the data traffic prior to forwarding the modified data traffic to a remote source located outside of the private network. Thus, embodiments herein can include detecting occurrence of one or more point-of-sale events in a private network, anonymizing the event information (e.g., data traffic), and forwarding the anonymized event information associated with the point-of-sale events out of the private network to a remote resource.

The term "scan" as described herein is generally defined to include all means of entering transaction items into a transaction terminal. Likewise, the term "scanner" is defined generally as any transaction terminal, automated and/or manual, for recording transaction information.

The forwarded event information (whether it is a scan or other information) associated with the point-of-sale transaction can be used for a number of reasons. For example, in one embodiment, the event information transmitted out of the private network can be used to identify a location in a video sequence where a particular event associated with the point-of-sale event occurred.

More specifically, an event of interest may be detection of a unique identifier value associated with an item being scanned at a point-of-sale terminal. In response to detecting an event such as detecting or recording of a valid identifier value such as a UPC code associated with a scanned item or an item that is being purchased, the point-of-sale terminal initiates generation and distribution of a communication (or event notification) such as one or more data packets over the private network to a remote resource such as point-of-sale server. In addition to the above events, the event also can be receiving input at a point-of-sale terminal from a cashier that enters a valid item identifier code. The point-of-sale server can be configured to process the event and return data such as pricing information associated with the item in the private network back to the point-of-sale terminal. The point-of-sale terminal tallies the price of the item being scanned with each other item scanned in a point-of-sale transaction.

As mentioned, such communications between the point-of-sale terminal and the point-of-sale server can be over a private network. Accordingly, there is not necessarily a need to protect the private information transmitted between the point-of-sale terminal and the server.

As mentioned above, to protect the private information when transmitted out of the private network, embodiments herein include removal, masking, obscuring, encoding, encrypting, etc., of the private information from data traffic in the private network and forwarding of the event information retrieved from the private network to a remote resource. The remote source outside of the private network can be configured to use the event information to identify, for example, a location in the video where a specific event such as a valid item scan occurs. Removal of the private information provides anonymity with respect to the point-of-sale transaction and allows possible public viewing of the point-of-sale transaction information in relation to the captured video. Thus, otherwise unusable data such as the point-of-sale transaction or event information retrieved from the private network can be anonymized, transmitted outside of the private network, and subsequently used for tagging relevant locations in a video sequence to indicate events of interest.

As mentioned above, the point-of-sale transaction information transmitted in the private network can be time stamped with different time information values at different nodes in the network. The clocks at different nodes may not be synchronized. In other words, system clocks associated with the surveillance camera taking the video of the point-of-sale transaction or corresponding video collection system may not be synchronized with the system clock of the point-of-sale terminal. The clocks may be offset with one another as well as drift over time. In one embodiment, a video manager utilizes clock information derived at multiple different nodes to determine a respective skew between a point-of-sale terminal and the video manager.

One way to achieve synchronization of system clocks at nodes in the network is use of the NTP (Network Time Protocol). However, application of NTP to synchronize may be undesirable.

In one embodiment, to provide synchronization, the computer system is configured to apply a time correction algorithm to identify a precise time when a point-of-sale event occurs. For example, in response to scanning of the item, the point-of-sale terminal generates a message including a time stamp information indicating when the corresponding message is generated by the point-of-sale terminal. The time stamp generated based on the point-of-sale terminal's clock. Such time corresponds to the approximate moment in time when the item is placed over the scan window and the detector of the point-of-sale term detects a unique identifier value specifying a parameter such as an item type associated with the scanned item. The point-of-sale terminal uses its own system clock to generate the time stamp. Meanwhile, the surveillance camera generates a set of time stamps for frames of video associated with the point-of-sale transaction. Upon transmission of the event notification though the network, each of multiple nodes records and forwards time information of a previous node as well as forwards its own timing information associated with processing of the event information.

Certain embodiments herein include applying the time correction algorithm so that the detected point-of-sale event can be synchronized with the captured video information. As discussed below in the detailed description of the application, application of the time correction algorithm can include calculating delays incurred as a result of transmitting the data through multiple nodes of a network from the point-of-sale terminal to a video collection and processing system.

Embodiments herein can facilitate detection and review of activity such as sweethearting or pass-throughs in a retail environment. In particular, the system disclosed herein can specify locations in a video sequence where incidents such as theft or loss of inventory occur at a point-of-sale transaction terminal. Tagging of video data as described herein enables a review of such events. For example, the events can be reviewed by an automated system that analyzes pixels of the video to identify detect fraudulent activity such as when a customer or store employee passes one or more items around the scanner (or RFID reader) without being scanned, or when the operator scans or manually enters an incorrect code into the transaction terminal for an item. If necessary, the tagged video data also can be reviewed manually by persons that study the video at the different scan times to identify whether an abuse has occurred. Other embodiments include applying video processing algorithms to identify events such as when sweethearting or pass throughs.

It is to be understood that point-of-sale terminals or cash registers that utilize scanning are only examples of transaction terminals to carry out embodiments herein and that embodiments herein are not limited to detecting fraud in retail types of environments. Additionally, note that scanning as described herein is not limited to laser scanning with a fixed scanner device, but can include handheld scanners, or Radio Frequency Identification (RFID) readers, etc., that are configured to identify items. Further, the system as described herein can be extended to environments in which an operator manually enters a code or other item identification via a keyboard into the transaction terminal. The system disclosed herein also can be configured to operate in environments where transaction data is available for comparison with video data associated with that transaction.

Other embodiments of the invention include any type of computerized device, workstation, handheld or laptop computer, POS or transaction terminal, or the like configured with software and/or circuitry (e.g., a processor) to process any or all of the method operations disclosed herein. The system may include the video camera(s) for obtaining the video, or the system may be a standalone computer that receives as input video data and scan data collected from one or more POS terminals in one or more retail locations. In other words, a computerized device or a processor that is programmed or configured to operate in any manner as explained herein is considered an embodiment of the invention. The system need not include the video camera and POS terminal, but instead may be an offsite computer system operated by a security service provider that receives the video and transaction data.

These and other embodiments will be discussed in more detail below.

As mentioned above, note that embodiments herein can include a configuration of one or more computerized devices, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product that has a computer-storage medium including computer program logic encoded thereon that, when performed in a computerized device having a processor and corresponding memory, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes computer readable storage media having instructions stored thereon for supporting operations such as those as described herein. The instructions, when carried out by a processor of a respective computer device, cause the processor to: monitoring a private network for presence of data traffic that is generated in response to a point-of-sale event; identifying private information in the data traffic; modifying the data traffic to prevent access to the private information by unauthorized entities; and forwarding the modified data traffic to a remote source located outside of the private network.

The ordering of the steps has been added for clarity sake; these steps can be executed in any suitable order.

Other embodiments of the present disclosure include software programs to perform any of the method embodiment steps and operations summarized above and disclosed in detail below.

Also, it is to be understood that the embodiments herein can be a software program, a combination of software and hardware, or as hardware alone. Example embodiments of the invention may be implemented within computer systems, processors, and computer program products and/or software applications manufactured by Stoplift, Inc. of Burlington, Mass., USA.

As discussed above, techniques herein are well suited for use in point-of-sale transaction such as those in which a consumer purchases a respective item. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or in combination with each other. Accordingly, the one or more present inventions as described herein can be embodied and viewed in many different ways.

The brief description of the disclosure does not specify every embodiment and/or incrementally novel aspect of the present disclosure or claimed invention(s). Instead, this brief description of embodiments herein only provides a preliminary discussion of different embodiments and corresponding points of novelty. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a computer system monitors a network for presence of communications associated with point-of-sale transactions. The communications can include point-of-sale transaction information or event notifications generated in response to purchase of an item at one of multiple point-of-sale terminals. Subsequent to detecting presence of the communications in the network and detecting that the communications pertain to a specific type of point-of-sale event (e.g., item scanning, credit card scanning, beginning and/or end of a consumer's purchase, etc.), the computer system such as a relay forwards the event information to a remote source. Prior to forwarding the event information, however, the computer system processes the communications to remove private information from the point-of-sale transaction information. This prevents the private information in the communications from being disclosed to unauthorized entities. In one embodiment, the communications are forwarded outside of a private network to a remote resource that utilizes the event information to identify locations of one or more events in captured video.

Figure 1:
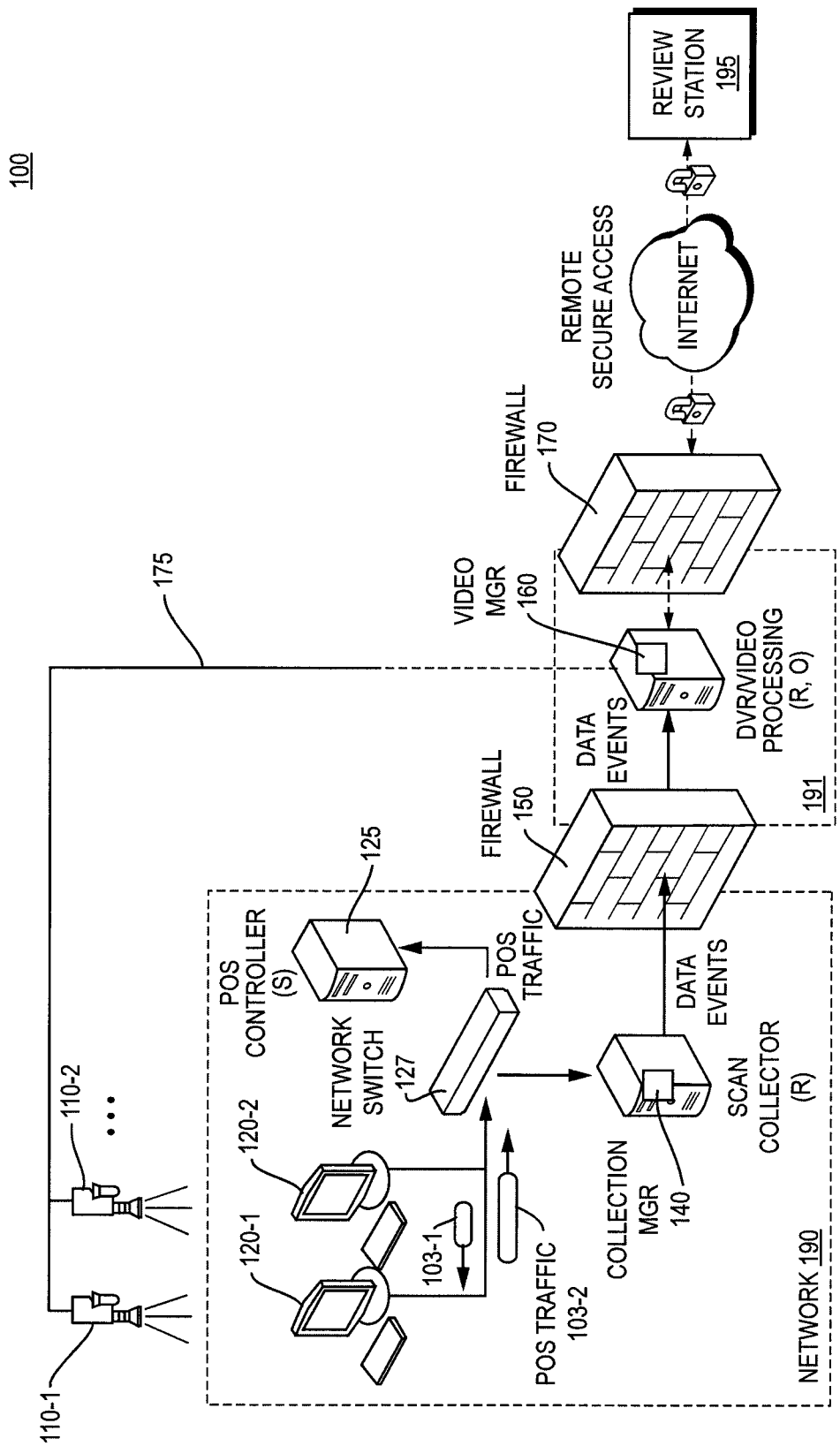
FIG. 1 is an example diagram of a computer environment for collecting and forwarding communications or event notifications according to embodiments herein.

More specifically, FIG. 1 is an example diagram of a computer environment 100 for collecting and forwarding communications according to embodiments herein.

In one embodiment, the network 190 resides in a retail environment in which consumers present retail items to point-of-sale terminals 120 for purchase. Network 190 can be a private network facilitating transactions in a retail environment.

Operators at the point-of-sale terminals 120 scan the items being purchased. In response to the scanning of an item and detection of an item identifier such as a bar code associated with an item, a respective point-of-sale terminal 120 in network 190 generates messages such as data packets for transmission over network 190 through one or more switches 127 to server 125. The server 125 receives the communications generated by a point-of-sale terminal and generates respective replies to a requesting point-of-sale terminal 120. For example, the server 125 transmits the replies over network 190 through software 127 to the appropriate one or more point-of-sale terminals 120.

Information exchanged between point-of-sale terminals and the server 125 can vary depending on the application. As an example, exchanged information can include credit card information, bar code information, card member information, item pricing information, etc.

In one embodiment, upon scanning of an item and detecting a valid identifier code at a point-of-sale term 120, the respective point-of-sale terminal forwards a price request for the scanned item to server 125. Server 125 receives the request for pricing information, performs a look-up of price information, and forwards pricing information associated with the item back to the respective point-of-sale terminal.

The network 190 can be configured to include a computer system configured to be a collection manager 140. The computer system or collection manager 140 represents a relay node for monitoring of data traffic such as communications, data packets, etc., between point-of-sale terminals 120 and the point-of-sale server 125.

The collection manager 140 or relay node can be configured to detect or filter different types of events associated with a point-of-sale transaction based on monitoring of the data traffic in network 190. In one embodiment, the collection manager 140 detects events as specified by the data traffic and notifies video manager 160 of events of interest associated with the point-of-sale transactions.

Although network 190 can be any type of network such as a public network, in one embodiment, as mentioned above, the network 190 can be configured to provide security with respect to personal consumer information associated with each of multiple point-of-sale transactions. For example, network 190 can support private or secured communications between the point-of-sale terminals 120 and the server 125. Network 190 can include a respective firewall 150 preventing unauthorized transmissions of inbound and outbound traffic to or from private network 190. Thus, the network 190 can exist in a designated store network environment that is inaccessible based on external internet communications.

The collection manager 140 can be configured to collect event information based on data traffic in network 190 and forward the detected event information through firewall 150 to a destination such as a remote source. In one embodiment, the remote source is video manager 160 residing in a so-called demilitarized zone (DMZ) network (e.g., a less protected network).

Based on the event information forwarded by the collection manager 140, the video manager 160 can synchronize the data events occurring at point-of-sale terminals 120 with other data events that occur at the video manager 160.

In an example embodiment, the video manager 160 captures video data associated with the respective point-of-sale transactions and utilizes communications received from the collection manager 140 to identify events occurring in captured video received by the video manager over video communication link 175. More specifically, video manager 160 is coupled, via video link 175, to receive video captured by surveillance cameras 110. The video link 175 can be a wire or wireless type of connection for conveying video captured by respective surveillance camera systems 110-1 and 110-2 for further processing by video manager 160.

The video information generated by the surveillance cameras 110 can include time stamp information indicating a relative time when the respective video is captured.

As mentioned, the collection manager 140 can detect events based on communications in network 190. The communications can include private information that is generated in response to one or more point-of-sale transactions. To protect the private information, embodiments herein can include removal, masking, obscuring, encoding, encrypting, etc., of the private information associated with data traffic 103 prior to forwarding of the event information to a remote resource such as video manager 160.

As an example, assume that an operator such as a cashier at point-of-sale terminal 120-1 scans an item presented for purchase. In response to scanning of the item and detecting a valid identifier code associated with the item, the point-of-sale terminal initiates transmission of one or more data packets through network 190 to server 125. The network switch 127 can be configured to convey the one or more data packets to a target destination such as server 125.

Additionally, switch 127 can intercept and/or forward a copy of the one or more messages to collection manager 140. The collection manager 140 analyzes the data packets to determine whether an event of interest has occurred for a point-of-sale transaction. For example, the collection manager 140 can intercept or receive copies of data traffic transmitted between a point-of-sale terminal and the server 120 and identify an event such as that the item being purchased was properly scanned by the cashier. Thus, the one or more data packets can indicate an event such as scanning of an item the point-of-sale terminal 120-1. The one or more data packets can include time stamp information indicating when the event occurred with respect to the point-of-sale terminal generating the data packets.

After identifying that the data packet indicates an occurrence of an event of interest (e.g., scanning of an item at a point-of-sale terminal such as a cash register system), the collection manager 140 modifies the data packet for transmission through firewall 150 to notify video manager 160 of the event. Prior to forwarding, as mentioned above, the collection manager 140 can initiate removal, masking, obscuring, encoding, encrypting, etc., of private information associated with the event. Recall that the private information associated with data traffic 103 can include a network address associated with the point-of-sale terminal 120 that generates the message, credit card information associated with the transaction, etc. As will be discussed later in this specification, the collection manager can generate time stamp information (based on the collection manager's clock) indicating a relative time when the collection manager 140 receives event information and when the collection manager 140 forwards the event information to the video manager 160.

In one embodiment, communications generated by a given point-of-sale terminal 120 can include an IP (source) address of the point-of-sale terminal generating the communications. The communications also can include an IP (destination) address of a target address (of server 125) in network 190 to which the communications are transmitted.

It may be desirable to prevent dissemination of this address information or other private information outside of network 190.

One way of protecting the transmission of private information outside of network 190 is to configure the collection manager 140 to remove such information prior to transmission outside of network 190. For example, the collection manager 140 can be configured to remove the IP source address and/or IP destination address (or other private information) from event information prior to forwarding to video manager 160. In such an instance, the IP addresses associated with resources in network 190 can be protected from being transmitted outside of network 190.

In certain instances, upon removing IP address information, it may be useful to provide an indication which point-of-sale terminal 120 generated respective communications without divulging the private information (e.g., network address information) out of network 190. For example, the collection manager 140 can be configured to store a map of IP address and generic identifier values associated with resources (e.g., the point-of-sale terminals 120, server 125, etc.) in network 190. Resources such as video manager 160 outside of network 190 can be apprised of an assignment of a generic identifier value with a respective point-of-sale terminal 120. Upon removing an IP address associated with event information, the collection manager 140 can map the IP address to an appropriate generic identifier value and associate the appropriate generic identifier value from the map to the event information forwarded to the video manager 160. Accordingly, the video metadata generator 160 can be apprised of which point-of-sale terminal 120 an event pertains without use of the private information. Thus, embodiments herein can include mapping the IP address of a point-of-sale terminal as specified by the data traffic to a corresponding generic identifier value associated with the point-of-sale terminal.

As a more specific example, assume that the communication manager 140 detects a scan event associated with point-of-sale terminal 120-1 and that the communications generated by point-of-sale terminal 120-1 include the source IP address of 192.168.100.1. Instead of transmitting the value 192.168.100.1 along with the event information outside of network 190, the collection manager 140 tags event information with a generic identifier value (in lieu of IP address information) to indicate that the event is associated with a particular point-of-sale terminal. In this way, the video manager 160 receiving the event information and corresponding identifier values can identify to which of multiple video streams each forwarded event pertains.

Note that removal of an IP address and insertion of a generic identifier value associated with an event is shown by way of non-limiting example only and that embodiments herein include other ways of protecting private information as described herein.

As mentioned, the video manager 160 outside of the network 190 can be configured to use the received event information to identify, for example, a location in the video where a specific event such as a valid item scan occurs. Removal of the private information as discussed above provides anonymity with respect to the point-of-sale transaction information and allows possible public viewing or less secured viewing of the point-of-sale transaction information in relation to the captured video. Thus, otherwise unusable data such as private point-of-sale transaction or event information in network 190 can be anonymized, transmitted outside of the private network, and subsequently used for tagging relevant locations in a video sequence to indicate events of interest.

In one embodiment, the event information transmitted out of the network 190 can be used to identify a location in a video sequence where a particular event associated with the point-of-sale event occurred. More specifically, an event of interest may be detection of a unique identifier value associated with an item being scanned at a point-of-sale terminal. In other words, the event of interest may be generated at an approximate time when an item is detected during a sweeping motion of the item over a detection system. In response to detecting a valid identifier value such as a UPC code associated with a scanned item, the point-of-sale terminal initiates generation and distribution of a communication such as one or more data packets within the confines of the network 190 to a remote resource such as point-of-sale server 125 that processes the event and returns data such as pricing information associated with the item in the private network back to the point-of-sale terminal. The point-of-sale terminal tallies the price of the item being scanned with each other item scanned in a point-of-sale transaction.

In general, there is an inherent delay between the time of scanning an item at a point-of-sale terminal and a time when the video manager 160 receives notification of the event. The amount of delay can vary depending factors such as how long it takes for each node in the network 190 to process and forward a communication.

There is also a time delay associated with capturing video by surveillance cameras 110, transmitting the captured information over video link 175, and further processing of the received video at video manager 160. However, the clocks associated with video manager 160 and surveillance cameras 110 can be synchronized with respect to each other.

The clocks at different nodes (in network 190 and network 191) of computer environment 100 may not be synchronized. In other words, system clocks associated with the surveillance cameras 110 taking the video of the point-of-sale transaction or corresponding video collection system (i.e., video manager 160) may not be synchronized with the system clocks of the point-of-sale terminals 120. The clocks may be offset with one another as well as drift over time. The video manager 160 therefore must be able to reconcile the notification of events received from collection manager 140 with the captured video in order to be useful.

One way to achieve synchronization of system clocks at nodes in the network is use of the NTP (Network Time Protocol). In general, NTP enables synchronization based on changing clock settings at nodes in the network. However, application of NTP to synchronize may be undesirable. Such a method can be very invasive and, for the example above, require significant changes to the POS environment. Furthermore, the clocks of each network device run slightly faster or slower than each other, which results in clock "drift". Also, NTP does not characterize nor correct for clock drift. Thus, if used, the clocks will only be synchronized immediately after a periodic NTP time correction and will immediately begin to drift thereafter. Such a drift can be significant when the clock accuracy needs to be within milliseconds, as is the case when synchronizing scan data with video data.

In one embodiment, to provide synchronization and enable the video manager 160 to identify events in the captured video, the video manager 160 can be configured to apply a time correction algorithm (FIGS. 4-7) to identify a precise time when a point-of-sale event occurs. For example, in response to scanning of the item, the point-of-sale terminal can generate a message including a respective time stamp information. The respective time stamp indicates (relative to the point-of-sale terminal) when the point-of-sale terminal generates the corresponding message. As mentioned above, such time corresponds to the approximate moment in time when the item is placed over the scan window and the detector of the point-of-sale term detects a unique identifier value specifying a parameter such as an item type associated with the scanned item.

The point-of-sale terminal uses its own system clock to generate the time stamp. Meanwhile, the surveillance camera generates a set of time stamps for frames of video associated with the point-of-sale transaction. The time stamp information as generated at each of multiple nodes enables the video manager to calculate a skew between a clock at the video manager 160 and the clock associated with each of the point-of-sale terminals.

Figure 2:
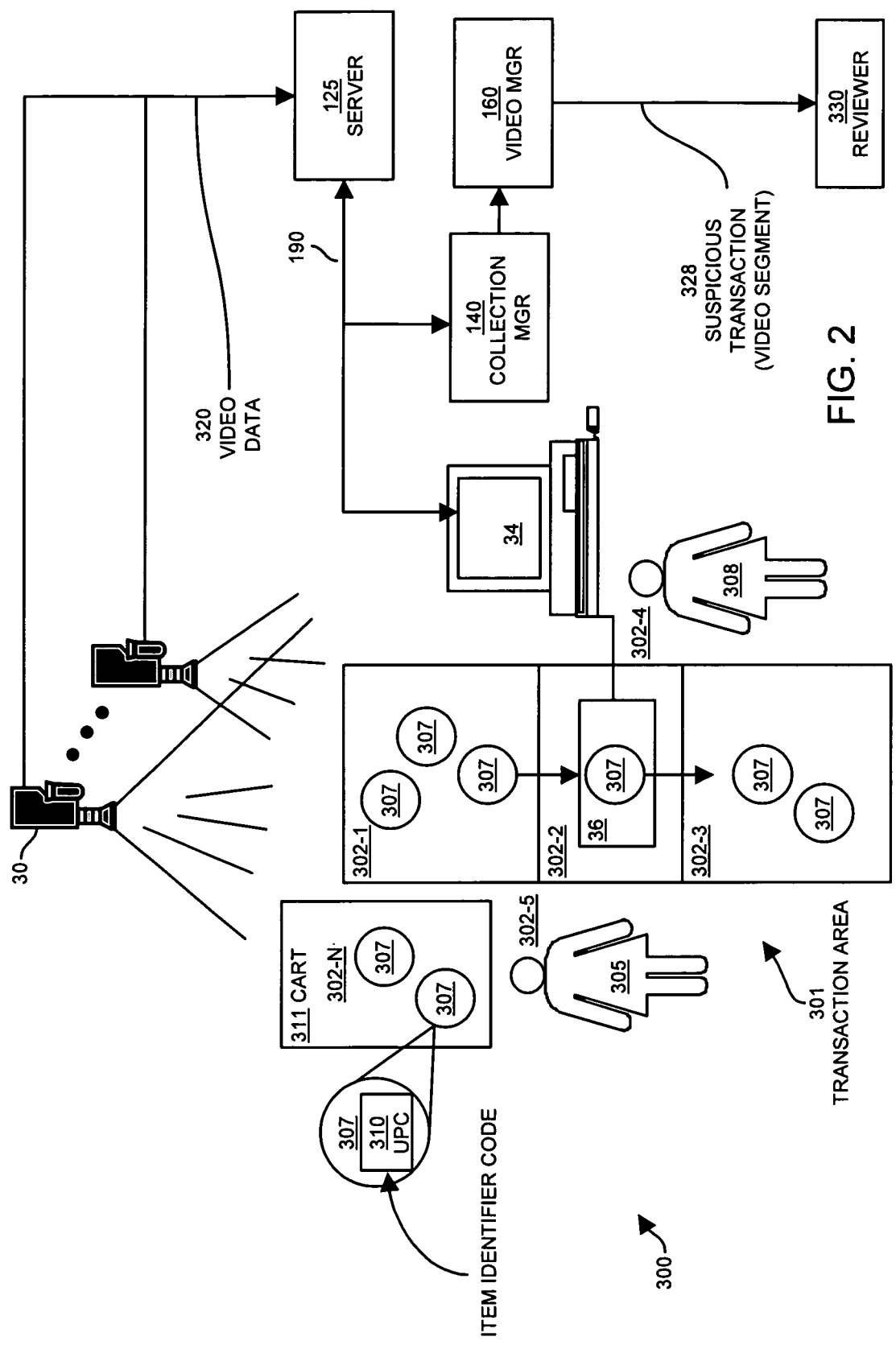
FIG. 2 is an example diagram of a point-of-sale terminal and camera surveillance systems according to embodiments herein.

FIG. 2 is an example diagram of a computer/network environment 300 including a point-of-sale terminal and camera surveillance systems according to embodiments herein.

For example, environment 300 depicts a retail establishment in which customers 305 can purchase items 307. A transaction terminal 34 such as a point-of-sale terminal or cash register is under control of an operator 308 such as a store employee to allow the customer 305 to purchase the items 307. The transaction terminal 34 includes a scanning device 36 that is able to detect and scan or otherwise read item identities 310, such as UPC barcode symbols or RFID tags affixed to each item 307 when those items 307 are brought within a predetermined proximity of the scanner device in the 36.

In a typical operation of the environment 300, the customer 305 approaches the transaction area 301 with a set of items 307 to be purchased. The items 307 may be contained, for example, with a shopping cart 311 or other item carrier transported by the customer 305 to the transaction area 301.

Alternatively, the customer 305 may carry the individual items 307 to the transaction area 301.

To purchase items 307, the customer 305 removes the items 307 from shopping cart 311 (or from their hands if carrying the items) and places the items into an item input region generally designated as region 302-1 within the transaction area 301. The item input region 302-1 may be a conveyor belt, countertop or other surface area onto which items to be purchased are placed prior to being detected and read by the scanner device 36 of the transaction terminal 34.

The operator 308 such as a store employee interacts with the transaction terminal 34 by logging in or otherwise activating the transaction terminal 34. This process may involve the operator 308 providing a unique operator identity to the transaction terminal 34. This can be a type of event detected by the collection manager and forwarded t the video manager 160.

During operation of the transaction terminal 34 by the operator 308, the body of the operator 308 generally remains within an operator region 302-4 of the transaction area 301.

Once logged in, the operator 308 can begin selecting items for purchase 307 within the item input region 302-1, such as by picking up the individual items 307 by hand. The operator 308 passes each item 307 from the item input region 302-1 over the scanner device 36 generally located within an item read region 302-2. Assuming proper (i.e., non-fraudulent and non-error) operator operation, the operator 308 positions the item 307 such that the item identities 310 (e.g., code information) affixed to the item can be detected by the scanner device 36.

In response to the scanner device 36 detecting an item identity 310 of the item 307 just scanned, the transaction terminal 34 register detects, on a valid scan, the item to be purchased and usually produces a notification to the operator 308 such as a beeping noise or tone to indicate that the item 307 has been successfully identified. In response to the notification, the operator 308 moves the item 307 into the item output region 302-3 which may be another countertop, downstream conveyor belt or the like that holds items 307 to have been successfully scanned or read by or entered into the transaction terminal 34.

As mentioned above, successful scanning and detecting of the item 307 over window of scanner device 36 can result in generation of one or more messages in network 190. The collection manager 140 detects the different events and notifies video manager 160.

The operator 308 repeats this process for each individual item 307 such that all items 307 to be purchased are moved from the item input region 302-1, over or through the item read region 302-2 (during which scanning of the item takes place) and into the item output region 302-3. In some cases, items 307 may not contain an affixed item identity 310 such as fruit, vegetables or the like.

In such cases, after removal of the item 307 from the item input region 302-1, the operator 308 manually enters the item identity into the transaction terminal 304 a keyboard or other manual input device to allow the transaction terminal 34 to register the item 307. In this manner, after all items 307 have been identified to the transaction terminal 34, the operator 308 can indicate to the transaction terminal 34 that the transaction is complete and the transaction terminal 34 calculates the total price of the items 307 to be purchased. The customer 305 then provides payment in that amount to the operator 308 and proceeds to remove the items 307 from the item output region 302-3 for transport out of the retail establishment.

As illustrated in FIG. 2, the environment 300 further includes a video source 30 such as one or more overhead video surveillance cameras that capture video of the transaction area 301. Typically, the video source 30 can be mounted in an elevated position sufficiently above the transaction area 301 to cover and capture video from the various regions 302.

As mentioned above, collection manager 140 notifies video manager 160 of the different events associated with the point-of-sale transaction, enabling the video manager 160 to tag locations to specify different events in the captured video. Because video manager tags frames of video to indicate different events, reviewer 330 (such as a human reviewer, a non-human reviewer such as a computer system executing a video analyzer, etc.) can play back portions of captured video around an event of interest as specified by the tags.

Figure 3:
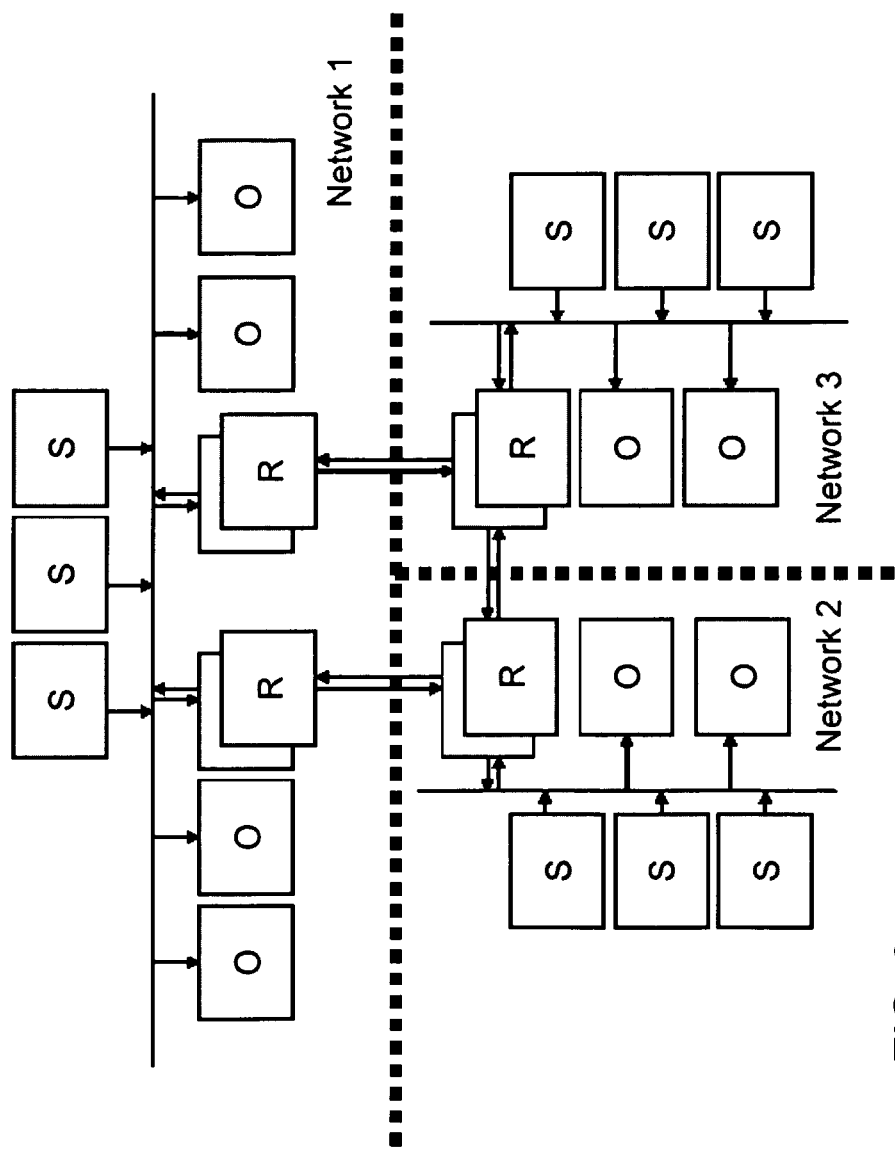
FIG. 3 is an example diagram illustrating monitoring of data traffic and forwarding of modified data traffic in a network environment according to embodiments herein.

FIG. 3 is an example diagram illustrating monitoring of data traffic (e.g., network #1) and forwarding of modified data traffic in a network environment to one or more other network according to embodiments herein.

For example, the basic communication strategy according to one embodiment includes event sources, observers, and relays. Event sources generate observable events on a network.

Some examples of observable events include, but are not limited to, TCP network traffic, serial port communication, audible beeps, video feeds from an analog or IP based camera or DVR, or visually observable events. Another example of an observable event is detection of a communication generated by a point-of-sale terminal in response to identifying a scanned item.

Observers residing on the network listen for the events. Relays listen for and possibly filter events and forward the events to a relay situated on another network, where the event is retransmitted and/or rebroadcast. Thus, a relay such as collection manager 140 also can act as a source. Observers and relays on the other network can listen for these relayed events and repeat the process, thus linking any number of networks together.

A schematic of a typical three-network communication architecture is shown in FIG. 3. Arrows indicate the direction of communication within each network and across each network. As shown, sources S generate events, which are transmitted on a shared bus. This "shared bus" can be, for example, a hard-wired version of network 190. The shared bus also can be a media such as the atmosphere, if the event is an audible alarm, for instance. Observers (labeled with the letter O) listen for events generated by each S (source). Relays R also listen for events, and pass them along between networks, where they act also as sources of events within that network.

Such a communication strategy enables synchronization of multiple devices across multiple networks with minimal impact on existing network infrastructure. For example, no special software needs to be added to existing network devices to enable synchronization, nor does this strategy require that the system clocks on these network devices be altered.

Figure 4:
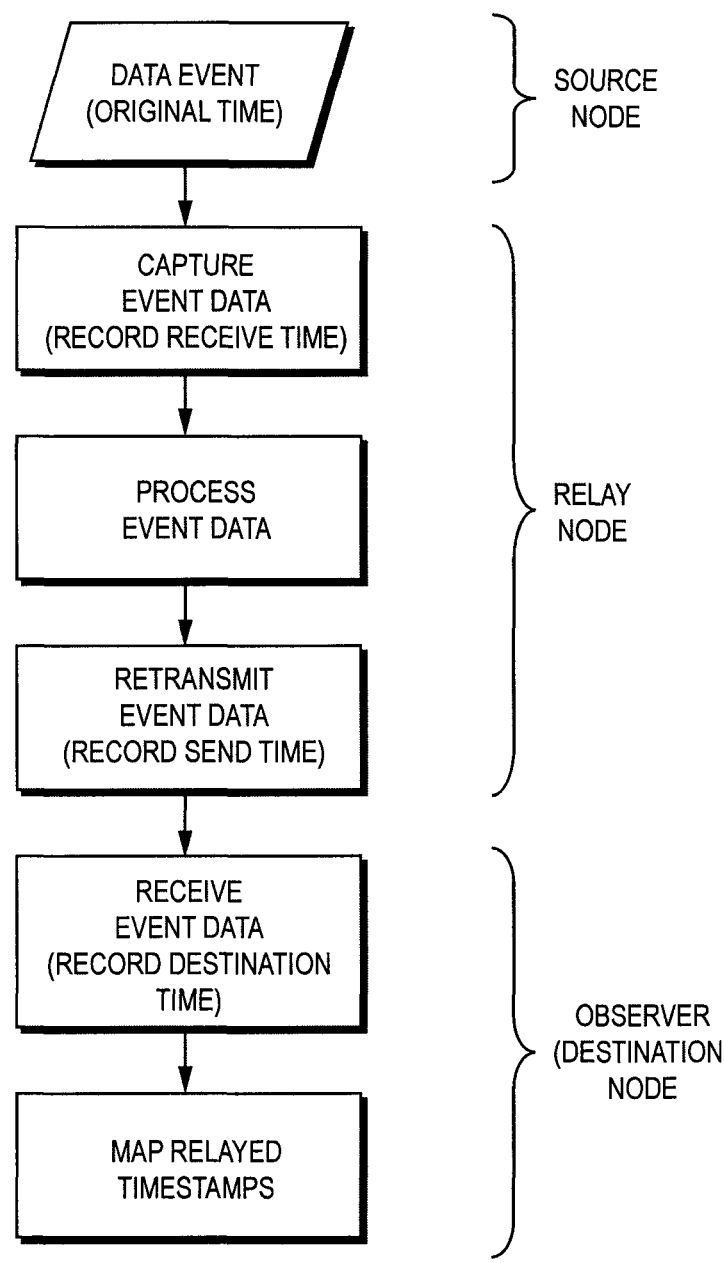
FIG. 4 is an example diagram of a flowchart for collecting time stamp information according to embodiments herein.

FIG. 4 is an example diagram of a method for collecting and processing time stamp information according to embodiments herein.

One aspect associated with flowchart 400 is to characterize every source of delay as it passes from node to node. Flowchart 400 depicts a form of the process showing a data event as it passes through one relay node. At each point throughout a communication path, a respective node generates timestamp information to the event (e.g., data packet) so that any source of delay can be characterized as will be discussed.

In one embodiment, the clocks at each node provide a resolution on order of one millisecond or higher such as a tenth of a millisecond.

The flow chart is broken down into three types of nodes: source nodes, observers, and relays. All the functions within a respective node use a common clock. For example, a node such as a personal computer may use its system clock to produce time stamp information. Each clock on each node may be independent of all others, and may run slower or faster than other nodes. The difference in clock times and clock drift are characterized by this communication strategy.

Source Node

As mentioned above, data generated by a source such as a point-of-sale terminal can include different types of event information. Examples of events can include point-of-sale transaction data, audible alarms to traffic light signaling information, etc. The process can also be applied to sparse event streams or to devices required to be synchronized but do not have any data to be transmitted.

If desired, clocks of different nodes in a respective network can be synchronized based on generation of artificial data events such as regular heartbeats.

Note that a data event may or may not contain a timestamp of its own. Since data events are typically generated by existing network infrastructure, it is not necessary for a source to generate time stamp information associated with a particular event.

Relay Node

Once the data event is produced, it is can be observed by each observer on the network, and also by each relay. Continuing with the basic data flow path outlined in FIG. 4, once the event is observed by the relay, it is immediately time-stamped upon receipt (based on the node's clock) so that any processing delay can accurately be characterized. The data event can be then placed on a queue in the node at which point the data is processed for removal of private information as discussed above prior to forwarding of the event to a destination such as video manager 160.

The event data can also remain in the queue of the collection manager 140 for a variable length of time. Before re-transmitting the processed event data to the destination node such as video manager 160, the relaying node such as collection manager 140 can make sure to wait until previous transmissions have been confirmed to be received, before sending out the next processed data event. The queue can also act as a temporary storage space to remain robust to connection failures. The event being forwarded to the destination node is time-stamped again (the "relay send time") by the collection manager (using the collection manager's clock) at a time of forwarding the event to the destination. As further discussed below, the time during which the event remains at the relay node for processing can then be calculated based on a difference between the receive time stamp information and send timestamp information.

Destination Node

Upon receipt, the destination node such as the video manager 160 affixes its own time stamp information to the received event notification. The destination node can send a confirmation of the receipt back to the collection manager 140. The data event is then recorded with all intermediate times affixed to it: relay observation time, relay send time, observer/destination/end point observation time as further described in FIGS. 6 and 7.

Figure 5:
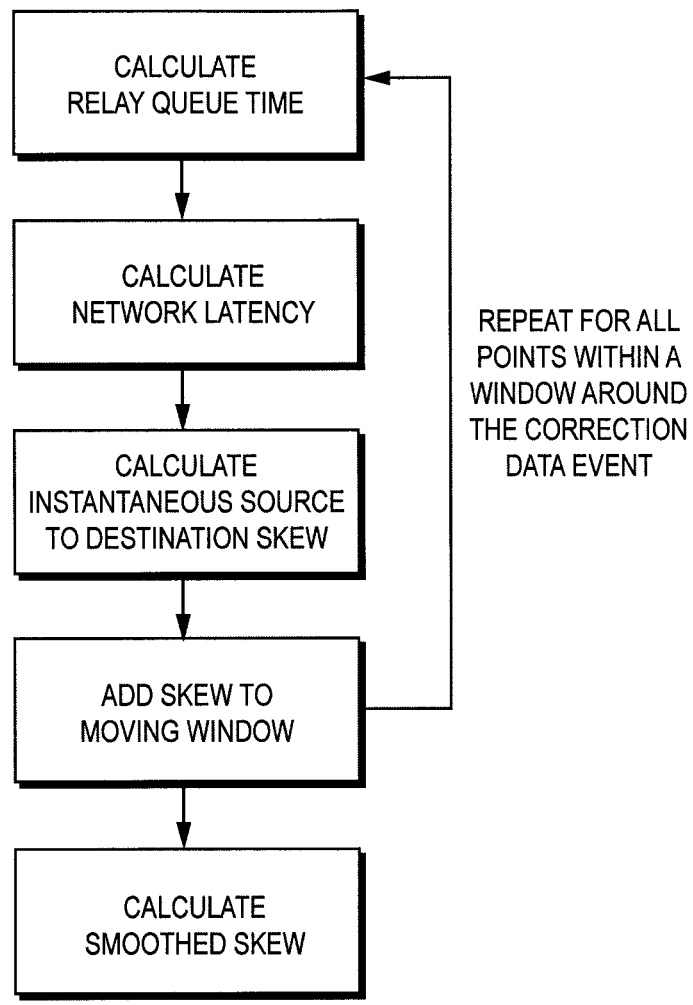
FIG. 5 is an example diagram of a flowchart for correcting differences associated with clocks according to embodiments herein.

FIG. 5 is an example flowchart for characterizing and calculating network delay according to embodiments herein.

Another source of delay associated with an event notification is network delay, which is different from the characterization of queue/processing delay within a node. In many cases where the system is deployed on a LAN environment, network latency may be negligible and, hence, can be ignored from calculations.

However, in other cases, the system might be deployed in a WAN environment, the current LAN configuration might introduce delay, and/or it is required that timestamps be as accurate as possible. In such instances, the network delay can be significant and warrant correction by embodiments herein.

In these latter cases, the network delay can be characterize in a variety of different ways. For example, one approach is to send ping messages to each node hop in the pipeline on a periodic basis. The destination node responds to the ping with a receipt. The round trip time can be measured by recording the local system time of the ping right before it is sent to the host and then another system timestamp is recorded on the same clock is recorded when the destination he original host sends a receipt back. These round trip time can be processed in real-time or as a post process using a variety of different filters such as a moving average. Additional embodiments can also include the use of variance to characterize the volatility of the network traffic. Accordingly, a latency associated with forwarding data in the network from one node to another can be accurately determined.

Figure 6:
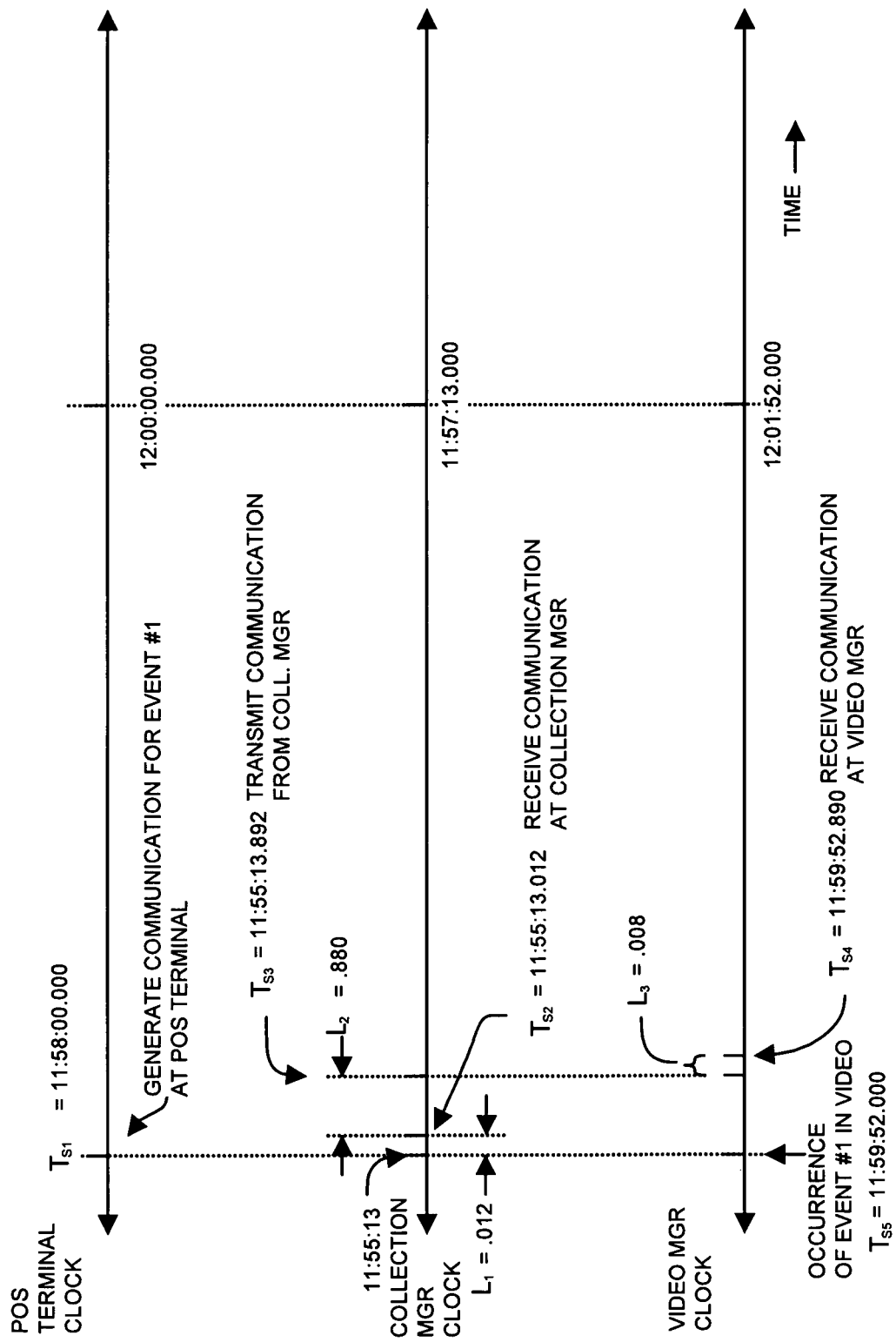
FIG. 6 is an example timing diagram illustrating time differences between clocks and generation of time stamp information at multiple different nodes according to embodiments herein.

FIG. 6 is an example timing diagram of time stamp information generated at different nodes according to embodiments herein.

As shown, each node has a corresponding independently operating time clock. The clocks at each of the different nodes are not synchronized with each other. For example, relative to the point-of-sale terminal clock, the clock associated with the collection manager 140 is behind by 2 minutes and 47 seconds. The clock associated with video manager 160 is ahead of the point-of-sale terminal clock by 1 minute and 52 seconds. The clock associated with video manager 160 is ahead of the collection manager clock by 4 minutes and 39 seconds. Thus, each of the clocks at nodes in computer environment 100 are offset or skewed with respect to each other. Note again that the clocks can drift with respect to each other over time.

As mentioned above, the video information such as video frames captured by surveillance cameras 110 are stamped based on a clock associated with video manager 160. Embodiments herein include utilizing the timestamp information generated at different nodes (e.g., point-of-sale terminals, collection manager 140, video manager 160, etc.) to identify at what time an event occurs even though the clocks are not synchronized with each other.

For example, in one embodiment, one or more nodes forwarding timing information indicating when a data packet has been received, generated, forwarded, etc. More specifically, as mentioned above, the point-of-sale terminal 120-1 generates a communication to include a time stamp. The first time stamp information (e.g., $T_{s1}$) indicates the time, relative to the point-of-sale terminal's clock, when the point-of-sale terminal generates the communication or event. In accordance with the embodiments as discussed above, the first time stamp information indicate a time when an event such as a scan of the item occurs.

The point-of-sale terminal forwards the communication over network 190 to server 125. The collection manager 140 receives at least a copy of the communication. Using the clock at the collection manager 140, the collection manager 140 records a time (e.g., second time stamp information $T_{se}$) of receiving the communication as well as a time (e.g., third time stamp information $T_{s3}$) of forwarding the communication over network 191 to the video manager 160. Delay time $L_1$ represents the amount of time that it takes to transmit the communication from the point-of-sale terminal to the collection manager 140.

The delay value $L_1$ may be negligible as the time to transmit the communication from the point-of-sale terminal and receive the communication at collection manager 140 may be minimal. The delay can be determined based on the analysis as discussed above such as calculating a round trip time of sending messages and dividing by 2.

The delay value $L_2$ can be substantial if the collection manager is not able to immediately forward a communication to the video manager 160. The value $L_2$ can be easily calculated by subtracting the send time $T_{s3}$ from the receive time $T_{s2}$.

The video manager 160 records a time when the communication is received from the collection manager 140. The video manager 160 uses its own clock to generate time stamp information $T_{s4}$ to indicate when the communication is received at the video manager 160. The video manager 160 also uses its own dedicated clock to generate the video sequences for each point-of-sale transaction being recorded. As mentioned, the clocks at each node may not be synchronized with respect to each other.

The value $L_3$ may be negligible as the time to transmit and receive a respective communication in network 191 may be minimal. As discussed below, the time stamp information generated from each node and forwarded to the video manager 160 enables the video manager 160 to identify a precise time when the event occurred relative to its own clock rather. In other words, the forwarded time stamp information enables clock synchronization.

Figure 7:
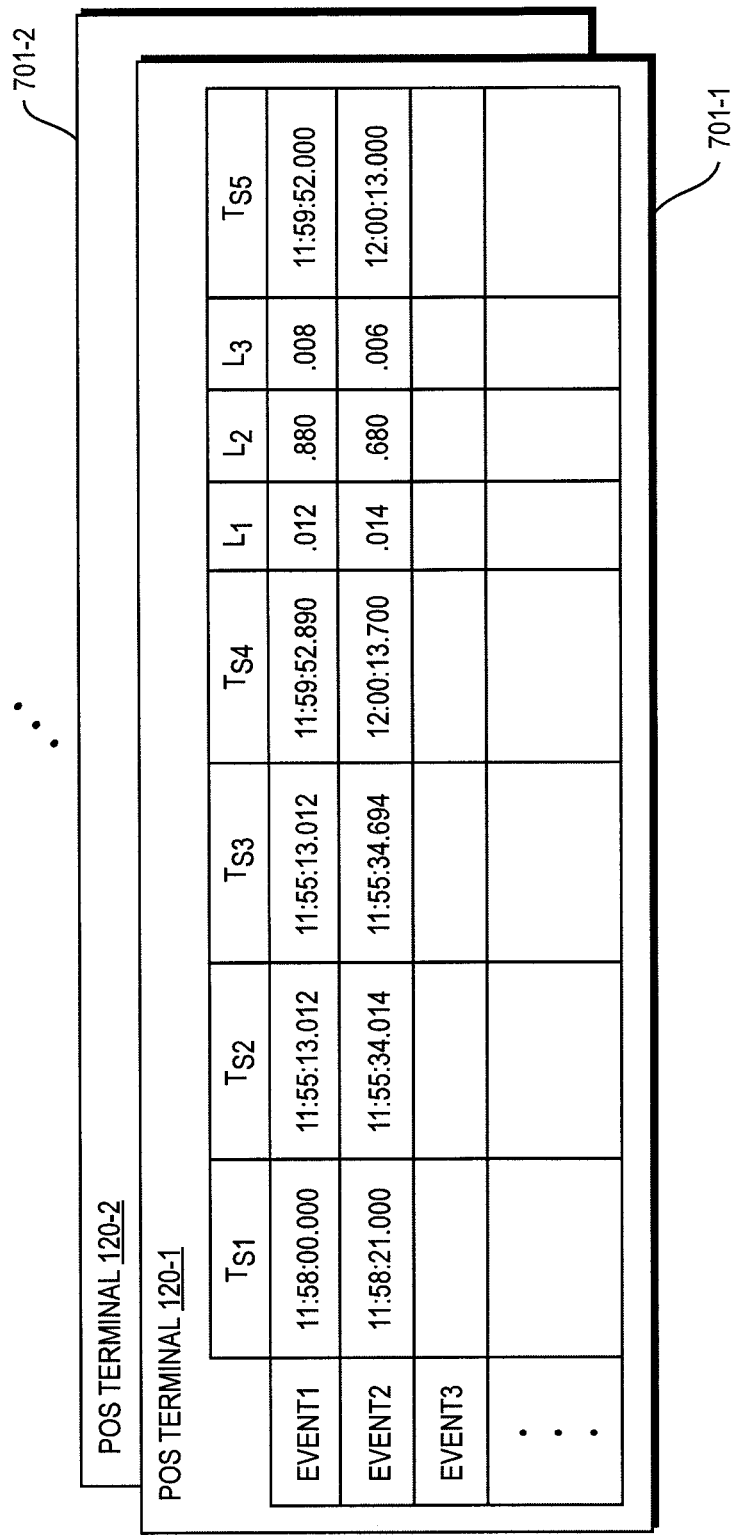
FIG. 7 is an example diagram of tables for storing time stamp information and adjusting for differences in clocks according to embodiments herein.

FIG. 7 is an example diagram of a table for storing time stamp information of FIG. 6 according to embodiments herein.

In one embodiment, the video manager 160 maintains one or more tables of event timing information associated with each video stream of a point-of-sale terminal produced by surveillance cameras 110. As discussed below, the video manager 160 populates each of the tables 701 (e.g., table 701-1, table 701-2, . . . ) with timing information from different network nodes as the vent information and time stamp information is received from the collection manager 140.

More specifically, the video manager 160 populates the table 701-1 for each event associated with point-of-sale terminal 120-1. As mentioned above, the time stamp values such as $T_{s1}$, $T_{s2}$, $T_{s3}$, etc. in table 701-1 represent the different system clock times associated with processing and forwarding of the communication (e.g., event notification) through the computer environment 100 to the video manager 160 as discussed above in FIG. 6. Again, the clocks at respective nodes in the computer environment 100 may not be synchronized. The information in tables 701 enables clock synchronization amongst nodes.

By way of a non-limiting example as shown in FIG. 6, when the clock at the point-of-sale terminal is 12:00:00 (hours:minutes:seconds), the clock of the collection manager 140 node is 11:57:13 and the clock at video manager 160 is 12:01:52. The clock at the point-of-sale terminal 120-1 is therefore ahead of the clock at the collection manager 140 by 2 minutes and 47 seconds. The clock at the point-of-sale terminal 120-1 lags behind the clock at the video manager 160 by 1 minute and 52 seconds. The table 701-1 of time stamp information enables the video manager 160 to correct for the difference between clocks and precisely identify locations of interest in respective video streams produced by surveillance cameras. For example, for event 1, at time $T_{si}$=11:58:00.000 (hours:minutes:seconds·milliseconds), it is known that the point-of-sale terminal generates and transmits a respective communication regarding an event of interest. The point-of-sale terminal notifies the collection manager 140 that the event occurred at time $T_{si}$=11:58:00.000, which is derived based on the point-of-sale terminal's clock.

The collection manager 140 receives the respective communication at time $T_{se}$=11:55:13.012 because the transmission delay is $L_1$=0.012 seconds (12 milliseconds). The collection manager 140 transmits the communication to the video manager 160 at time $T_{s3}$=11:59:13.892. This difference between $T_{s3}$ and $T_{se}$ indicates that the communication was delayed for queuing and processing by an amount $L_2$=0.880 seconds (880 milliseconds) while in the collection manager 140. The collection manager 140 forwards time information $T_{si}$, $T_{s2}$, and $T_{s3}$ to the video manager 160. The time $T_{s2}$ and time $T_{s3}$ are generated based on the collection manager's clock.

The video manager 160 receives the communication from the collection manager 140 at time $T_{s4}$=11:59:52.890 ($T_{s4}$ is generated based on the video manager's clock). The latency $L_3$ between transmitting the communication and receiving it at the video manager 160 is 8 milliseconds.

To calculate a skew between the video manager's clock and the point-of-sale terminal's clock, the video manager 160 first adds values $L_1$, $L_2$, and $L_3$. to produce a total delay value. The video manager 160 subtracts the total delay value from the time $T_{s4}$ to produce time $T_{s5}$. The video manager 160 determines the skew between the point-of-sale terminal's clock and the video manager's clock by calculating a different between time $T_{s5}$ and time $T_{si}$. In this example, the time different between the point-of-sale terminal's clock and the video manager's clock is 1 minute and 52 seconds. Time $T_{s5}$ indicates a location in the video sequence where event 1 occurs.

Note that the skew can be calculated in a similar manner for each event. In one embodiment, the video manager 160 generates an average skew value based on a moving window of a latest set of multiple detected events in table 701.

Based on information in tables 701, the skews between different nodes such as between the video manager's clock and each of the other point-of-sale terminal's clocks can be calculated.

Time Correction

Thus, with this embodiment, the relay node timestamps are used to calculate processing delay and network delay. Other implementations might use the relay time as the time of the data event, if the data event does not contain any timestamp information. To calculate the queue time or $L_2$, the video manager determines a difference between the receive time and send time. To calculate network latency the method as discussed above (such as determining a round trip time between nodes and dividing by 2) can be used to determine a latency between nodes. As mentioned above, the networks may forward traffic so quickly and efficiently that the latency times are negligible and therefore not used in a calculation.

In one embodiment, the skew between the video manager's clock and the point-of-sale terminal can be determined for each of a predetermined number of most recent events in table 701-1. With this implementation the instantaneous skews are placed into a moving window and the median is extracted from it. Generating an average skew value representing a time different between clocks alleviates the effects of sudden jumps in network latency and can filter out other sources of error. Other embodiments can including fitting a line using a least squares estimate to characterize and compensate for clock drift as well.

After generating the skew value indicating a difference between clocks at different nodes in computer environment 100, the skew difference can be applied to the original data event timestamp such as $T_{s1}$ to translate the time of the event at time $T_{s1}$ (associated with the point-of-sale terminal) to a time with respect to the video clock when the event occurred.

Clock Drift

Note that the system clocks at each node of the network are not necessarily synchronized and may drift with respect to each other over time. As mentioned above, a standard method of synchronizing clocks, such as through the use of NTP on a regular schedule, still suffer from clock drift between synchronization calls.

Embodiments herein can be employed to overcome clock drift in a couple of ways. One way is through an event-driven synchronization procedure, where each network device observes the same event happening at the same time (correcting for network latency, which was described previously). Such a method can ensure that timestamps local to each network device are associated with each event. Generating the skew rate at event times provides more accurate synchronization since the synchronization occurs at the most useful times—when events occur.

In the event of extremely high or unpredictable network latency, which may occur if a link goes down between networks, another method of synchronizing network clocks is employed. For example, in this second case, each network device does not observe the same event happening at the same time. However, previous (and possibly future) simultaneously observed events may be used to characterize the extent of the drift between any two clocks on any two network devices. For example, one may assume (but is not limited to that assumption) that there is a linear relationship between the differences, or skew, between any two clocks. In this case, for example, linear regression can be used to fit a line to such data to compute the precise skew which will put one clock on one network device into the clock on another device. This will allow the continued synchronization of events even at times when network latency precludes the simultaneous observation of events.

Figure 8:
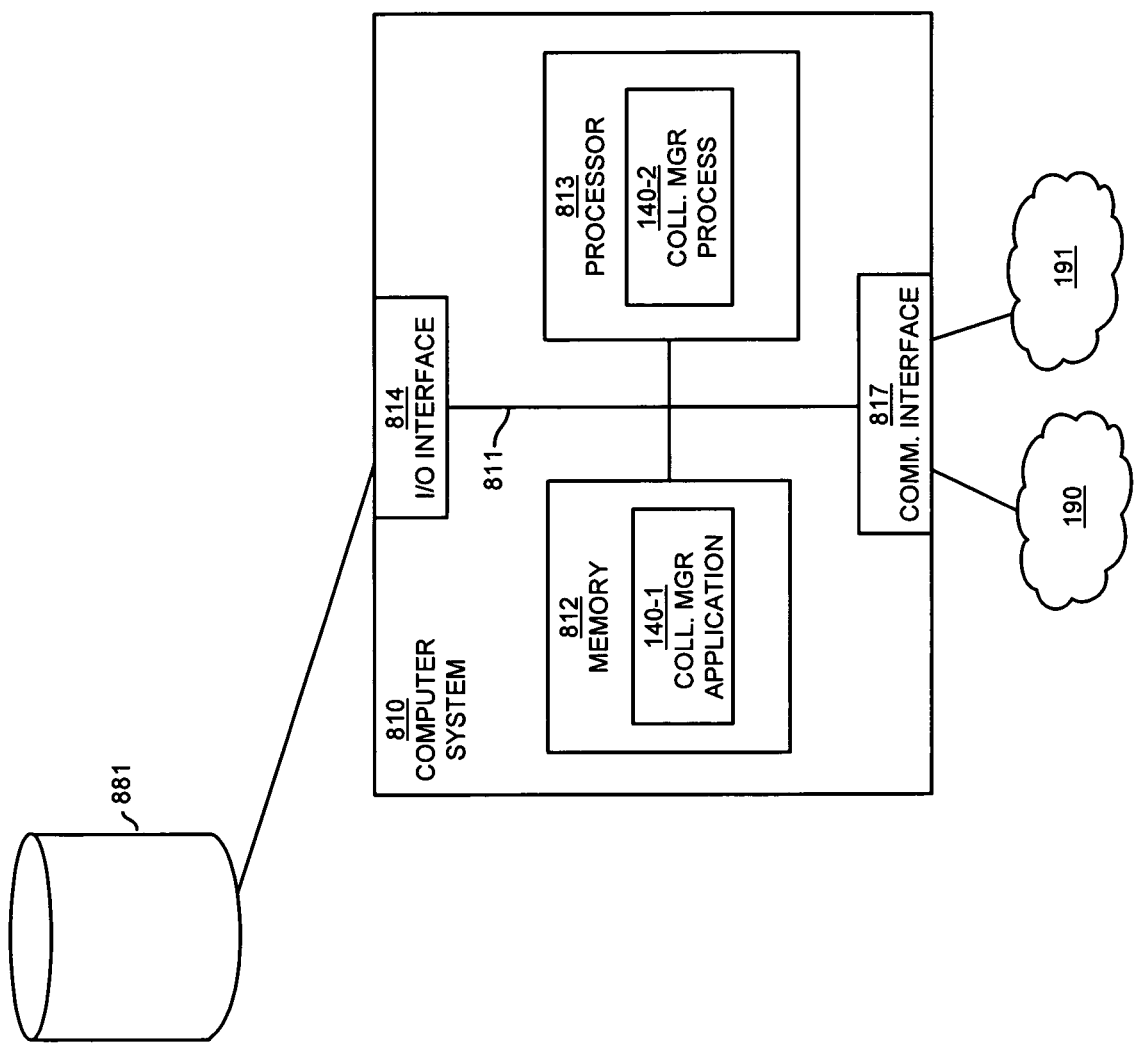
FIG. 8 is a diagram illustrating an example computer architecture for carrying out functionality according to embodiments herein.

FIG. 8 is a block diagram of an example architecture of one or more computer systems in computer environment 100 for implementing any of the manager and/or related functions according to embodiments herein. In other words, the computer system is an example architecture for executing collection manager 140, video manager 160, etc.

Computer system 810 can be a computerized device such as a personal computer, workstation, portable computing device, console, network terminal, processing device, network device, etc.

Note that the following discussion provides a basic embodiment indicating how to carry out functionality associated with a manager function. However, it should be noted that the actual configuration for carrying out the operations as described herein can vary depending on a respective application.

As shown, computer system 810 of the present example includes an interconnect 811 that couples a memory system 812, a processor 813 (i.e., one or more processors), I/O interface 814, and a communications interface 817.

I/O interface 814 provides connectivity to peripheral devices 816, if such devices are present, such as a keyboard, mouse, display screen, etc.

User 808 can provide input to computer system 810. Communications interface 817 enables computer system 810 and, more particularly, collection manager 140 to receive communications from a resource in network 190 as well as communicate event information as described herein over network 191 to one or more resources such as video manager 160. I/O interface 814 enables the collection manager 140 to retrieve locally stored information from repository 881.

As shown, memory system 812 can be encoded with collection manager application 140-1 that supports functions as discussed above and as discussed further below. The collection manager application 140-1 can be embodied as software code such as data and/or logic instructions. Execution of the software code supports processing functionality according to different embodiments described herein.

During operation of one embodiment, processor 813 accesses memory system 812 via the use of interconnect 811 in order to launch, run, execute, interpret or otherwise perform the logic instructions of the collection manager application 140-1. Execution of the collection manager application 140-1 produces processing functionality in collection manager process 140-2. In other words, the collection manager process 140-2 represents one or more portions of the collection manager application 140-1 performing within or upon the processor 813 in the computer system 810.

It should be noted that, in addition to the collection manager process 140-2 that carries out method operations as discussed herein, other embodiments herein include the collection manager application 140-1 itself such as the un-executed or non-performing logic instructions and/or data. As mentioned, the collection manager application 140-1 may be stored on a computer storage medium (e.g., a repository) such as a floppy disk, hard disk or in an optical medium. According to other embodiments, the collection manager application 140-1 can also be stored in a memory type system such as in firmware, read only memory (ROM), or, as in this example, as executable code within the memory system 812 (e.g., within Random Access Memory or RAM).

In addition to these embodiments, it should also be noted that other embodiments herein include the execution of the functionality as described herein via processor 813. Thus, those skilled in the art will understand that the computer system 810 can include other processes and/or software and hardware components, such as an operating system that controls allocation and use of hardware resources.

Functionality supported by a resource such as collection manager 140 according to embodiments herein will now be discussed via flowcharts in FIGS. 9-10. Note that there will be some overlap with respect to concepts discussed above for FIGS. 1 through 7. Also, note that the steps in the below flowcharts need not always be executed in the order shown.

Figure 9:
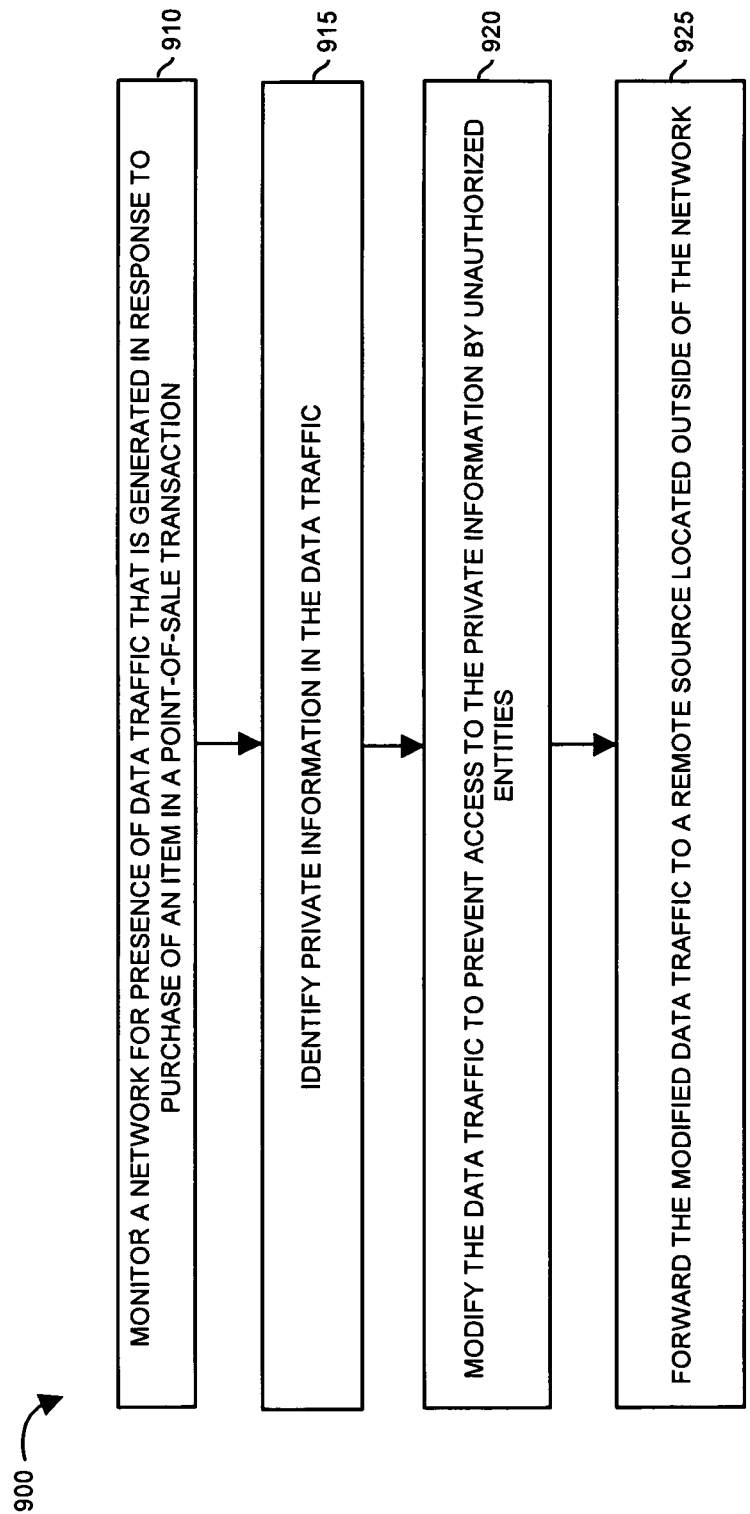
FIG. 9 is a flowchart illustrating an example method in which one or more computer systems monitor network traffic and forward the network traffic to a remote source.

FIG. 9 is a flowchart illustrating an example method in which one or more computer systems monitor network traffic and forward the network traffic to a remote source.

In step 910, the collection manager 140 monitors network 190 for presence of data traffic that is generated in response to purchase of an item in a point-of-sale transaction.

In step 915, the collection manager 140 identifies private information in the data traffic.

In step 920, the collection manager 140 modifies the data traffic to prevent access to the private information by unauthorized entities.

In step 925, the collection manager 140 forwards the modified data traffic to a remote source such as video manager 160 located outside of the network 190.

Figure 10:
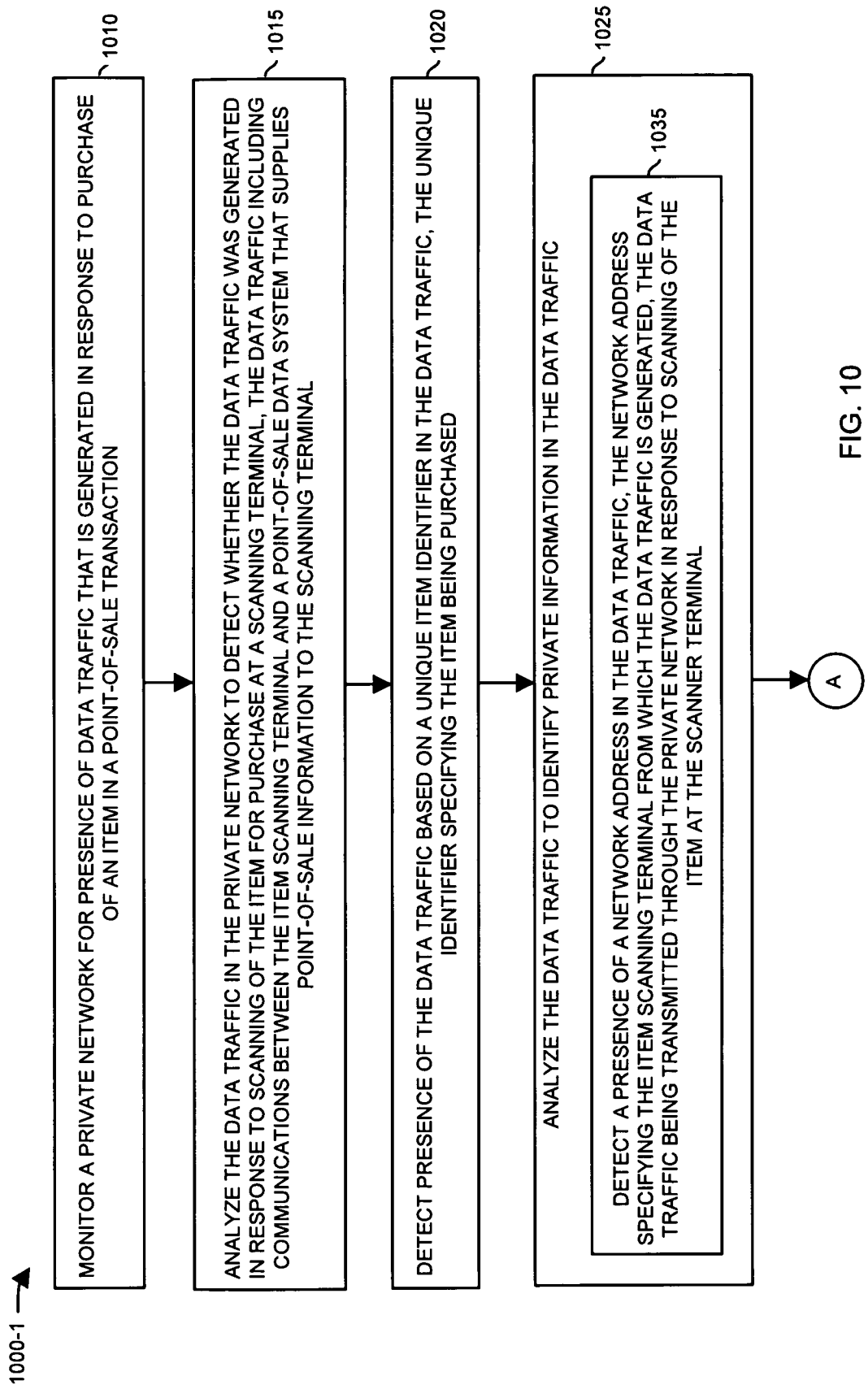
FIGS. 10 and 11 combine to form an example method in which communications in a private network are used to identify events in captured video according to embodiments herein.
Figure 11:
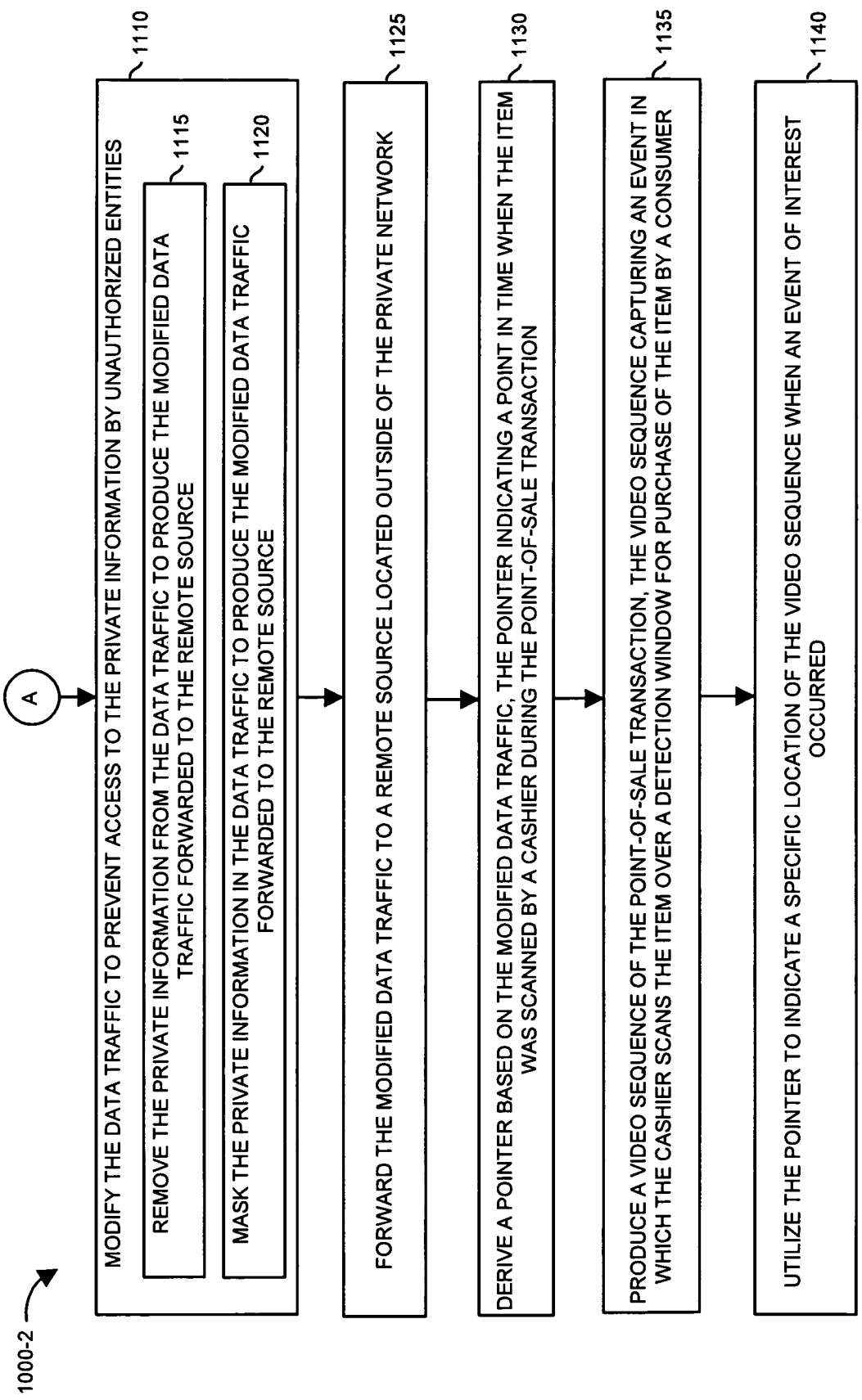

FIGS. 10 and 11 combine to form an example flowchart 1000 (e.g., flowchart 1000-1 and flowchart 1000-2) in which a collection manager detects events and notifies video manager 160 according to embodiments herein.

In step 1010, the collection manager 140 monitors a network 190 for presence of data traffic 103 that is generated in response to occurrence of an event such as purchase of an item in a point-of-sale transaction.

In step 1015, the collection manager 140 analyzes the data traffic 103 in the network 190 to detect whether the data traffic 103 was generated in response to an event such as scanning of the item for purchase at a point-of-sale scanning terminal. In one embodiment, the data traffic 103 can be communications transmitted between the item scanning terminal (e.g., a point-of-sale terminal) and a point-of-sale data system (e.g., a server 125) that supplies point-of-sale information to the point-of-sale scanning terminal.

In step 1020, the collection manager 140 detects presence of the data traffic 103 based on detecting a unique item identifier in the data traffic. The unique identifier such as a bar code specifies the type of item being purchased.

In step 1025, the collection manager 140 analyzes the data traffic 103 to identify private information in the data traffic 103.

In step 1035, the collection manager 140 detects a presence of a network address in the data traffic. The network address specifies the item scanning terminal (e.g., point-of-sale terminal) from which the data traffic 103 is generated. In one embodiment, the data traffic 103 is transmitted through the network 190 in response to scanning of the item at the scanner terminal.

In step 1110, the collection manager 140 modifies the data traffic to prevent access to the private information by unauthorized entities. For example, the collection manager 140 can remove the private information from the data traffic in step 1115 to produce the modified data traffic forwarded to the remote source such as the video manager 160. As an alternative, the collection manager 140 can mask or encode the private information in step 1120 to produce the modified data traffic forwarded to the remote source such as the video manager 160.

In step 1125, the collection manager 140 forwards the modified data traffic to a remote source such as video manager 160 located outside of the private network In step 1130, the video manager 160 derives a pointer (e.g., a time value) based on the modified data traffic. The pointer can indicate a point in time when the event occurred in the point-of-sale transaction.

In step 1135, the video manager 160 can produce a video sequence of the point-of-sale transaction. The video sequence captures an event such as video capturing the cashier scanning an item over a detection window of a point-of-sale terminal for purchase of the item by a consumer.

In step 1140, the video manager 160 utilizes the pointer (e.g., time stamp information or skew information) to determine and indicate a specific location of the video sequence when an event occurred.

Note again that techniques herein are well suited for management of software resources using a hierarchical license tree as described herein. However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method, comprising:
monitoring, by instructions that execute on a processor from a non-transitory computer-readable storage medium, a private network;
detecting, by the instructions, a presence of data traffic generated in response to an item scan transaction at a terminal, the data traffic comprising non-private transaction information and private transaction information;
modifying, by the instructions, the data traffic that includes the non-private and the private transaction information to prevent access to the private transaction information by unauthorized entities;
accumulating, at a relay node during transport of the data traffic, time stamps indicative of receipt of the data traffic by the relay node, the relay node comprising relay instructions executed by a relay node processor of the relay node from a relay node non-transitory computer-readable storage medium, the relay instructions on the relay node representing: a collection manager and a video manager, and the collection manager and the video manager when executed by the relay node processor causes the relay node processor to perform processing comprising:
  receiving, by the collection manager, the data traffic including the time stamps of item scans, including the item scan, from a plurality of terminals including the terminal used to perform the item scan; and
  receiving, by the video manager, video information captured from each of the plurality of terminals to identify the item scans;
creating, by the instructions, video time stamps for frames of captured video associated with the video information, the video time stamps indicating times based on when the item scan occurred and the video information was captured;
computing, by the instructions and based on the accumulated time stamps, a processing latency incurred by the data traffic during network transport to the video manager;
identifying, by the instructions and based on the computed latency, a point in time in the video information corresponding to a time of the item scan occurring at the terminal by determining a skew between a terminal clock for the terminal and a video manager clock for the video manager;
synchronizing, by the instructions, the accumulated time stamps with the video time stamps based on the skew so that the point in time in the video information is synchronized with the time the item scan occurred at the terminal to produce a synchronized time set;

forwarding, by the instructions, the modified data traffic and the synchronized time set to a remote source located outside of the private network;

determining, by the instructions, an event of interest has occurred at a specific point in time from the synchronized time set; and tagging, by the instructions, one or more of the frames of captured video to indicate the event of interest in the synchronized time set.

2. The method of claim 1 further comprising:

producing, by the instructions, a video sequence of the item scan transaction, the video sequence comprising an event in which the item is captured in the video sequence as the item passes over a detection window; and inserting, by the instructions, a pointer to indicate the specific location in the video sequence at which the detection window, in response to detecting the item scan transaction, generates the data traffic and transmits the data traffic in the private network.

3. The method of claim 1, wherein monitoring the private network further comprises:

analyzing, by the instructions, the data traffic to detect whether the data traffic was generated in response to detection of the item; and responsive to detecting that the data traffic was generated in response to detection of the item, forwarding, by the instructions, the modified data traffic to the remote source.

4. The method of claim 1, wherein monitoring the private network further comprises:

analyzing, by the instructions, communications between the terminal facilitating the item scan and a data system; and filtering, by the instructions, the communications to identify the presence of the data traffic.

5. The method of claim 4, wherein filtering the communications to identify the presence of the data traffic includes detecting presence of the data traffic based on a unique item identifier in the data traffic, the unique identifier specifying the scanned item.

6. The method of claim 1 further comprising:

generating, by the instructions, a first time stamp, the first time stamp indicating a time at which the data traffic is detected in the private network; and generating, by the instructions, a second time stamp, the second time stamp indicating a time at which the modified data traffic is forwarded to the remote source.

7. The method of claim 1 further comprising:

determining, by the instructions, a time delay between detecting the presence of the data traffic in the private network and forwarding the modified data traffic to the remote source, via the first time stamp and the second time stamp.

8. The method of claim 1, wherein modifying the data traffic to prevent access to the private transaction information by unauthorized entities includes:

removing the private transaction information from the data traffic to produce the modified data traffic that is forwarded to the remote source.

9. The method of claim 1, wherein modifying the data traffic to prevent access to the private transaction information by unauthorized entities includes:

masking, by the instructions, the private transaction information in the data traffic to produce the modified data traffic forwarded to the remote source.

10. The method of claim 1, wherein identifying the private transaction information in the data traffic includes detecting a presence of a network address in the data traffic, the network address specifying the terminal from which the data traffic is generated, the data traffic being transmitted through the private network in response to detection of the item at the terminal; and wherein modifying the data traffic to prevent access to the private transaction information includes:

mapping, by the instructions, the network address associated with the terminal to a generic identifier value associated with the terminal; and associating, by the instructions, the generic identifier value with the modified data traffic to indicate that the terminal generated the data traffic.

11. The method of claim 1 further comprising:

initiating, by the instructions and external to the private network, real-time collection of the video information associated with the item scan transaction, the real-time collection of the video information capturing an event in which the item has been detected by the terminal; and determining, by the instructions, a time value indicating a time at which the event occurred, during a real-time collection of the video data, based on timing information associated with the modified data traffic.

12. The method of claim 11, wherein the timing information associated with the modified data traffic includes: timing information generated by clocks at multiple nodes in the private network to produce the time value.

13. The method of claim 1 further comprising:

determining, by the instructions, latency stamps based on a transport latency incurred from network transmission of the data traffic.

14. The method of claim 13 further comprising:

determining, by the instructions, the transport latency by sending a probe (ping) message to evoke a response for synchronizing timing delays.

15. The method of claim 1 further comprising:

forwarding, by the instructions, the modified data traffic to the remote source when a predetermined activity is identified based on the video information corresponding to the time of the item scan.

16. The method of claim 1 further comprising:

creating, by the instructions, first timing information indicating when the data traffic is generated by—the terminal facilitating the transaction, the data traffic generated in response to a scanning of the item at the terminal;

creating, by the instructions, second timing information at a collection node, the second timing information indicating a time difference between receiving the notification of the data traffic and forwarding of the modified data traffic to the remote source;

creating, by the instructions, third timing information indicating a time when the remote source receives the modified data traffic; and processing, by the instructions, the first timing information, second timing information, and third timing information to derive a time delay value, the time delay value representing an amount of time between generation of the data traffic at the terminal and receipt of the modified data traffic at the remote source.

* * * * *